United States Patent
Seo et al.

(10) Patent No.: US 8,837,885 B2
(45) Date of Patent: Sep. 16, 2014

(54) OPTIC COUPLER, OPTICAL FIBER LASER DEVICE, AND ACTIVE OPTICAL MODULE USING THE SAME

(75) Inventors: Hong Seok Seo, Daejeon (KR); Bong Je Park, Daejeon (KR); Joon Tae Ahn, Daejeon (KR); Jung-Ho Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 85 days.

(21) Appl. No.: 13/615,225

(22) Filed: Sep. 13, 2012

(65) Prior Publication Data
US 2013/0243377 A1     Sep. 19, 2013

(30) Foreign Application Priority Data
Mar. 15, 2012 (KR) ........................ 10-2012-0026729

(51) Int. Cl.
*G02B 6/26* (2006.01)
*G02B 6/42* (2006.01)

(52) U.S. Cl.
USPC .................. 385/43; 385/27; 385/31; 385/37; 385/39; 385/45; 385/50; 385/115; 359/341.1; 359/341.2; 359/341.3; 359/345; 372/6; 372/70; 372/71

(58) Field of Classification Search
CPC ............. G02B 6/2852; H01S 3/06708; H01S 3/06745; H01S 3/094007; H01S 3/094049; H01S 3/094053

USPC ............. 385/37, 43; 359/341.1, 341.2, 341.3; 372/6, 70, 71
See application file for complete search history.

(56) References Cited

U.S. PATENT DOCUMENTS

| | | | |
|---|---|---|---|
| 5,864,644 A | 1/1999 | DiGiovanni et al. | |
| 5,999,673 A | 12/1999 | Valentin et al. | |
| 7,209,615 B2 | 4/2007 | Fishteyn | |
| 7,327,920 B2 | 2/2008 | Dong et al. | |
| 2009/0154879 A1* | 6/2009 | Salokatve | 385/43 |
| 2011/0134512 A1* | 6/2011 | Ahn et al. | 359/341.3 |
| 2011/0261580 A1* | 10/2011 | Seo et al. | 362/553 |

* cited by examiner

*Primary Examiner* — Ryan Lepisto
(74) *Attorney, Agent, or Firm* — Rabin & Berdo P.C

(57) ABSTRACT

The inventive concept provides optic couplers, optical fiber laser devices, and active optical modules using the same. The optic coupler may include a first optical fiber having a first core and a first cladding surrounding the first core, a second optical fiber having a second core transmitting a signal light to the first optical fiber and a third cladding surrounding the second core, third optical fibers transmitting pump-light to the first optical fiber in a direction parallel to the second optical fiber; and a connector connected between the first optical fiber and the second optical fiber, the connector extending the third optical fibers disposed around the second optical fiber toward the first optical fiber, the connector comprising a third core connected between the first core and the second core and a fifth cladding surrounding the third core.

21 Claims, 14 Drawing Sheets

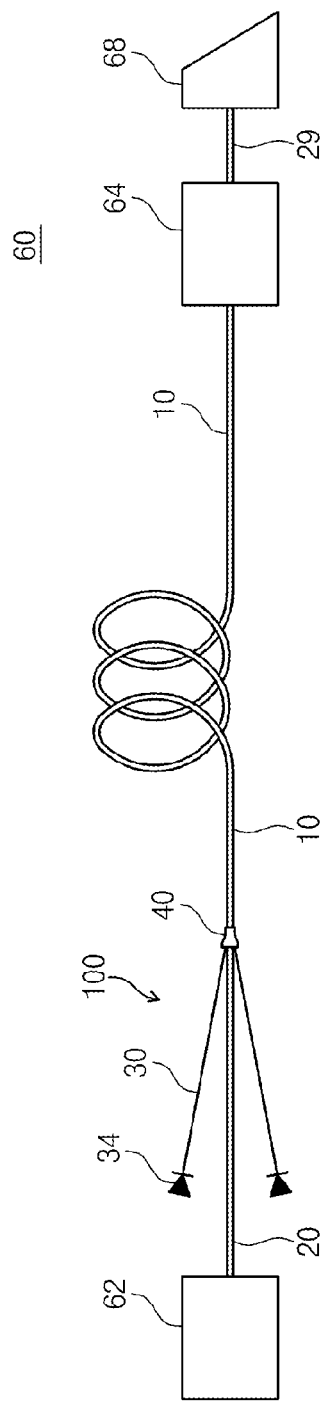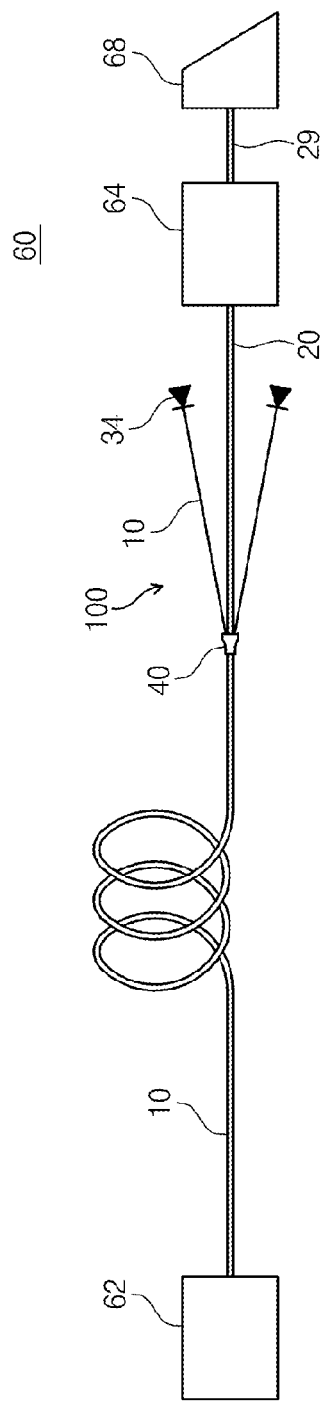

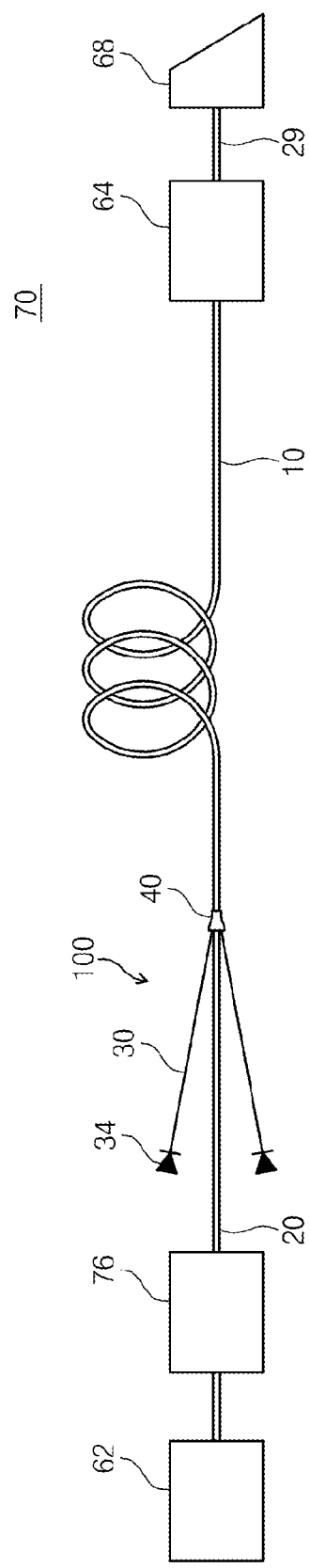
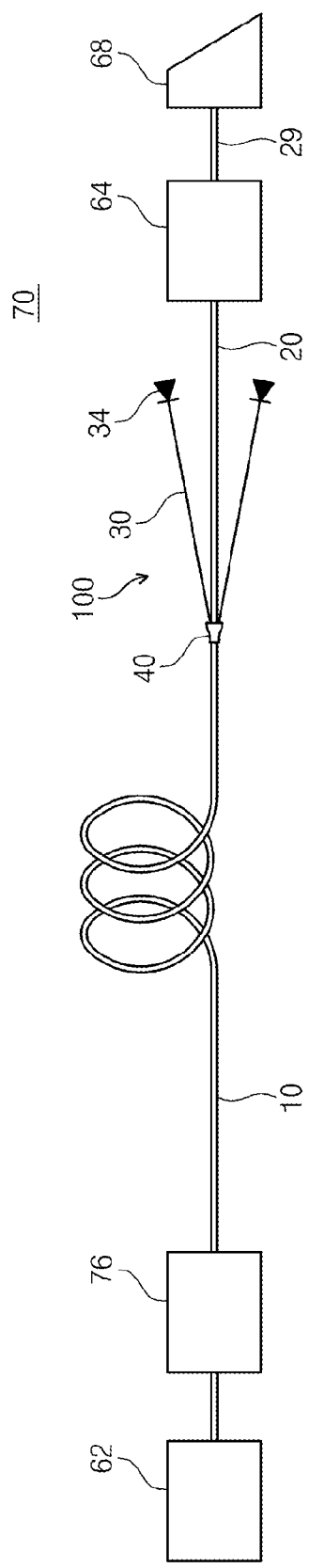

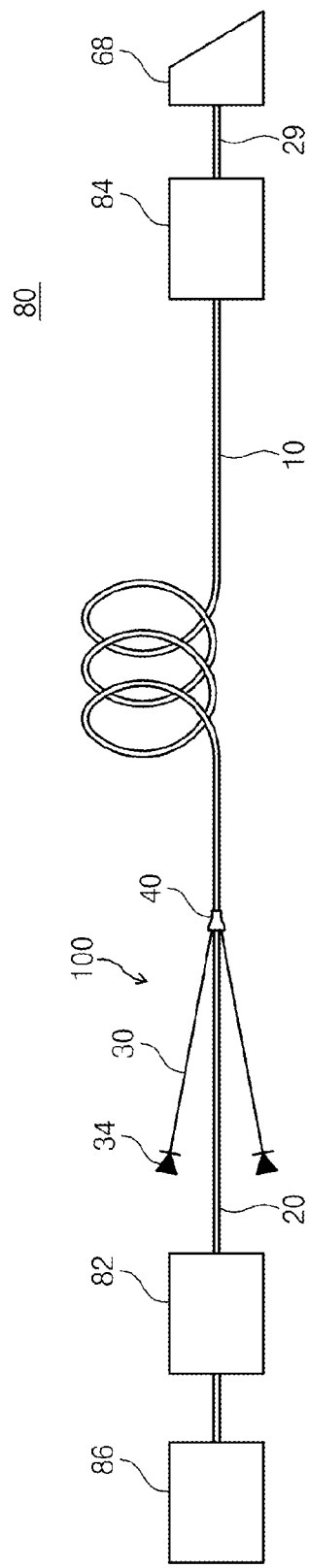
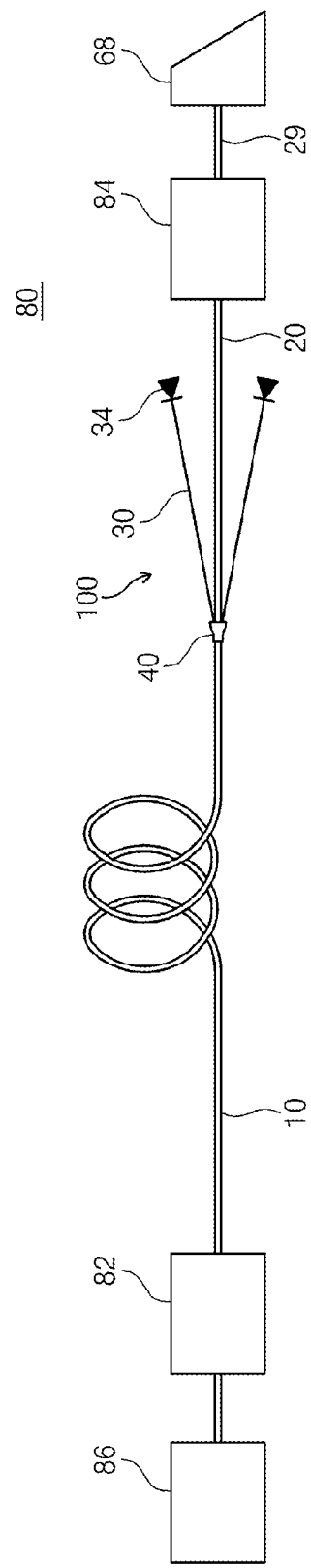
Fig. 14A
Fig. 14B

OPTIC COUPLER, OPTICAL FIBER LASER DEVICE, AND ACTIVE OPTICAL MODULE USING THE SAME

CROSS-REFERENCE TO RELATED APPLICATIONS

This U.S. non-provisional patent application claims priority under 35 U.S.C. §119 to Korean Patent Application No. 10-2012-0026729, filed on Mar. 15, 2012, the entirety of which is incorporated by reference herein.

BACKGROUND

The inventive concept relates to optic couplers, optical fiber laser devices, and active optical modules using the same and, more particularly, to optic couplers transmitting pump-light to an optical fiber, optical fiber laser devices, and active optical modules using the same.

An optical communication improves mass data communication and information processing speed. A light source used in the optical communication mainly uses a laser light of a single wavelength. The laser light may be generated by various kinds of laser devices. The laser devices used in the optical communication may include a surface emitting laser device and an optical fiber laser device. The optical fiber laser device may include an optical fiber having a double cladding structure. The optical fiber laser device may supply pump-light into a core to which an active material is added, thereby generating the laser light. Thus, the pump-light may be efficiently supplied to the core of the optical fiber, so that a high power laser light may be realized.

For example, in the double cladding optical fiber laser structure, the pump-light of a pumping light source may be incident through a first cladding of the optical fiber. A cross sectional area of the first cladding may be about 100 times, or more, greater than that of the core and the first cladding may have a refractive index greater than that of a second cladding. Thus, the first cladding may efficiently transmit a signal light of a multi-mode semiconductor substrate. Additionally, the first cladding may receive pump-light incident from the outside. The pump-light may be absorbed into rare-earth ions in the core in the first cladding. Excited rare-earth ions may travel along the core. And then a good quality optical fiber laser light may be generated through a mirror inside or outside the optical fiber.

SUMMARY

Embodiments of the inventive concept may provide optic couplers capable of improving joining efficiency of optical fibers, optical fiber laser devices and active modules using the same.

Embodiments of the inventive concept may also provide optic couplers capable of efficiently supplying pump-light to a core of an optical fiber, optical fiber laser devices, and active optical modules using the same.

In one aspect, an optic coupler may comprise: a first optical fiber having a first core and a first cladding surrounding the first core, a second optical fiber transmitting a signal light to the first optical fiber, a third optical fibers providing a pump-light to the first optical fiber in a direction parallel to the second optical fiber, and a connector disposed between the first optical fiber and the second optical fiber, the connector connected with the third optical fibers disposed around the second optical fiber toward the first optical fiber.

In some embodiments, the first optical fiber may comprise a double cladding optical fiber further having a second cladding surrounding the first cladding.

In other embodiments, the second optical fiber may comprise a pure mode optical fiber having a second core and a third cladding surrounding the second core.

In still other embodiments, the third optical fibers may comprise a multi-mode optical fiber having a fourth core.

In even other embodiments, the connector may comprise a third core connected between the first core and the second core, and a fifth cladding surrounding the third core, the fifth cladding connected between the first cladding and the third cladding. the third core has a diameter equal to that of each of the first and second cores. the third core is tapered between the first core and the second core In another aspect, an optical fiber laser device may comprise: a first optical fiber having a first core, and first and second claddings surrounding the first core; a second optical fiber a second core transmitting a signal light to the first optical fiber and a third cladding surrounding the second core; third optical fibers transmitting pump-light to the first optical fiber in a direction parallel to the second optical fiber, the third optical fibers having fourth cores disposed around the second optical fiber, respectively; and a connector having a third core connected between first core and the second core and a fifth cladding surrounding the third core, the third core having a Bragg grating, and the fifth cladding connecting the third optical fibers disposed around the second optical fiber toward the first optical fiber.

In some embodiments, the third core of the connector may be tapered toward the second core when the first core has a diameter greater than that of the second core.

In other embodiments, the fifth cladding may be tapered toward the first cladding when the first and third claddings have the same diameter. In still another embodiment, an active optical module may comprise: a pump-light source supplying pump-light, an optic coupler including a first optical fiber, a second optical fiber, third optical fibers, and a connector, the first optical fiber having a first core and a first cladding surrounding the first core, the second optical fiber transmitting a signal light to the first optical fiber, the third optical fibers providing a pump-light to the first optical fiber in a direction parallel to the second optical fiber, and the connector disposed between the first optical fiber and the second optical fiber and connected with the third optical fibers disposed around the second optical fiber toward the first optical fiber, a first optical device connected to the second optical fiber of the optic coupler, and a second optical device connected to the first optical fiber opposite to the first optical device, the second optical device outputting laser light generated in the first optical fiber, the second optical fiber, and the connector by the pump-light.

In some embodiments, the active optical module may have a forward pumping mode where the connector of the optic coupler is disposed in a direction from the first optical device to the second optical device.

In other embodiments, the active optical module may have a backward pumping mode where the connector of the optic coupler is disposed in a direction from the second optical device to the first optical device.

In still other embodiments, the optic coupler may be provided in plural; and the active optical module may have a bi-directional pumping mode where the connectors of the plurality of optic couplers are disposed to face each other.

In even other embodiments, the optic coupler may be provided in plural; and the active optical module may have a multi-forward pumping mode where the connectors of the plurality of optic couplers are disposed in the same direction.

In yet other embodiments, the first optical device may be a first mirror and the second optical device may be a second mirror.

In further embodiments, the active optical module may further include: a modulator disposed at the first optical fiber between the first and second mirrors.

In still further embodiments, the first optical device may be a first isolator and the second optical device may be a second isolator.

BRIEF DESCRIPTION OF THE DRAWINGS

The inventive concept will become more apparent in view of the attached drawings and accompanying detailed description.

FIGS. 12A to 12D are schematic diagrams illustrating an active optical module according to a fourth embodiment of the inventive concept;

FIGS. 13A to 13D are schematic diagrams illustrating an active optical module according to a fifth embodiment of the inventive concept;

FIGS. 14A to 14D are schematic diagrams illustrating an active optical module according to a sixth embodiment of the inventive concept.

DETAILED DESCRIPTION OF THE EMBODIMENTS

Figure 1:
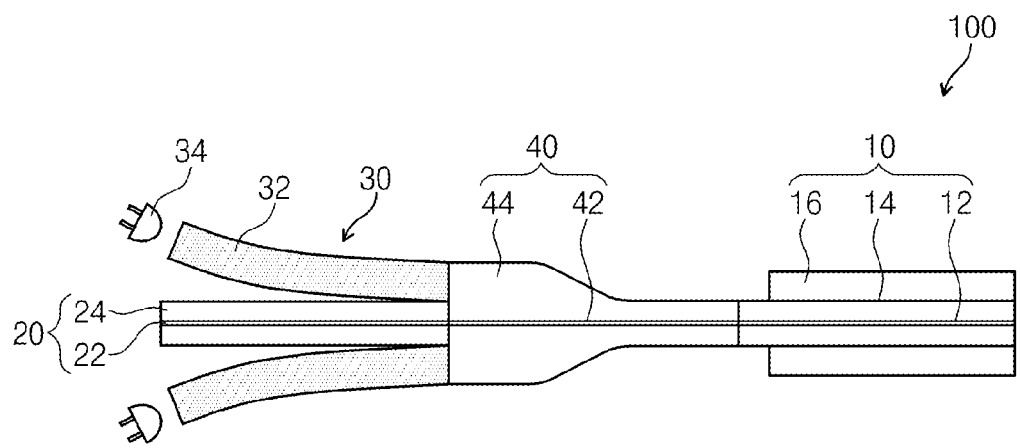
FIG. 1 is a cross-sectional view illustrating an optic coupler according to a first embodiment of the inventive concept.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, optic couplers according to embodiments of the inventive concept will be described with reference to the drawings.

FIG. 1 is a cross-sectional view illustrating an optic coupler according to a first embodiment of the inventive concept.

Referring to FIG. 1, an optic coupler 100 according to a first embodiment may include a connector 40 disposed between a first optical fiber 10 and a second optical fiber 20. The connector 40 may connect third optical fibers 30 to each other. The third optical fibers 3 transmit pump-light in a direction parallel to the second optical fiber 20.

The first optical fiber 10 may be a double cladding optical fiber or a photonic crystal fiber which includes a first core 12, a first cladding 14, and a second cladding 16. The first and second claddings 14 and 16 surround the first core 12. The first core 12 may absorb the pump-light traveling in a direction where the third optical fibers 30 are joined to the connector 40. The first core 12 may include an active material that absorbs pump-light to perform Amplified Spontaneous Emission (ASE). The active material may include a rare-earth element. The rare-earth element may absorb pump light, and thus, an electron excited to a metastable state is stabilized, thereby emitting laser light of a single wavelength. The rare-earth element may include at least one of erbium (Er), ytterbium (Yb), and thulium (Tm). Er, Yb, and Tm may generate laser light of about 1550 nm wave band, laser light of about 1080 nm wave band, and laser light of about 2000 nm wave band, respectively. The first core 12 may include a single-mode core or a multi-mode core. The first core 12 may have a constant diameter without having a discontinuously cut surface, in the first cladding 14. The first core 12 may have a refractive index higher than those of the first and second claddings 14 and 16.

Each of the first and second claddings 14 and 16 may include a silica glass and a polymer component. If the first optical fiber 10 is the double cladding optical fiber, each of the first and second claddings 14 and 16 may have a refractive index lower than that of the first core 12. The first cladding 14 may have a refractive index higher than that of the second cladding 16. A refractive index difference between the first core 12 and first cladding 14 may be within a range of about 0.001 to about 0.005. The second cladding 16 may include a fluorine-based polymer.

If the first optical fiber 10 is the photonic crystal fiber, the first core 12 of the photonic crystal fiber may include a silica glass to which the rare-earth element is added. An interface region between the first core 12 and the first cladding 14 of the photonic crystal fiber may include a silica glass having a plurality of fine pores arranged in a longitudinal direction. The second cladding 16 of the photonic crystal fiber may include a silica glass having the same refractive index as that of the first core 12. Fine pores in an interface region between the first and second claddings 14 and 16 may also be arranged in the longitudinal direction. A size of each of the fine pores in the interface region between the first and second claddings 14 and 16 may greater than that of each of the fine pores in the interface region between the first core 12 and the first cladding 14.

The second optical fiber 20 may be a single-mode optical fiber or a few-mode optical fiber transmitting a signal light to the first optical fiber 10. Here, the single-mode may be defined as transmitting light in one way, and the few-mode may be defined as transmitting light in two or three ways. The second optical fiber 20 may include a second core 22 and a third cladding 24. The second core 22 and the third cladding 24 of the second optical fiber 20 may have the same diameters and the same refractive index as those of the first core 12 and the first cladding 14 of the first optical fiber 10, respectively. Even though not shown in the drawings, an optical device supplying the signal light may be disposed at another side of the second optical fiber 20 which is opposite to the connector 40.

The third optical fiber 30 may be a multi-mode optical fiber of a large core diameter. The third optical fiber 30 may have a core and a cladding for transmitting the pump-light or a silica glass pump optical fiber without a core and a cladding. Alternatively, the third optical fiber 30 may include a multi-mode optical fiber having a fourth core 32 of a hard polymer cladding-shape or a hard silica cladding-shape. The third optical fibers 30 may be connected to the connector 40 along an outer surface of the third cladding 24 of the second optical fiber 20. The pump-light may be transmitted to the connector 40 and the first optical fiber 10 through the third optical fibers 30. The pump-light may be completely incident into the first cladding 14 of the first optical fiber 10. Here, the first cladding 14, the fourth core 32 and a fifth cladding 44 may have the same refractive index.

A pump-light source 34 may generate the pump-light. The pump-light source 34 may include a laser diode (LD) generating the pump-light by a power source applied from the outside of the optic coupler 100. The laser diode may be manufactured in a single emitter-shape, a bar-shape, or a stack-shape. The pump-light source 34 may generate the pump-light having at least one of 808 nm, 915 nm, 950 nm, 980 nm, 1480 nm and other wavelengths according to light emitting materials.

The connector 40 may include a third core 42 and the fifth cladding 44. The third core 42 may be connected between the first core 12 and the second core 22. The third core 42 may have the same diameter and the same refractive index as those of the first and second cores 12 and 22. The fifth cladding 44 may connect the first cladding 14 to the third cladding 24 in one direction. Additionally, the fifth cladding 44 may fix the third optical fibers 30 disposed around the third cladding 24. The third optical fibers 30 may be fixed around the third cladding 24 in a single layer or plural layers. For example, the fifth cladding 44 may fix about six the third optical fibers 30 around the third cladding 24. Thus, the fifth cladding 44 may connect the second optical fiber 20 and the third optical fibers 30 to the first optical fiber 10.

As illustrated in FIG. 1, a second facet of the fifth cladding 44 adjacent to the third cladding 24 may have a first diameter substantially equal to an outer diameter of an bundle consisting of the third cladding 24 and the fourth cladding 32 around the third cladding 24. A first facet of the fifth cladding 44 adjacent to the first optical fiber 10 may have a second diameter equal to the diameter of the first cladding 14. The fifth cladding 44 may be tapered from the second optical fiber 20 toward the first optical fiber 10.

Light loss of the first and third optical fibers 10 and 30 joined to the fifth cladding 44 may be determined depending on beam parameter product (BPP). The BPP value may correspond to the product of an outside diameter and a numerical aperture of the optical fiber. Here, the numerical aperture is a value determining an incident angle controlling transmittance of light. The numerical aperture may correspond to a sine value of a maximum angle where the light is total-reflected in the optical fiber without being refracted to the outside of the optical fiber. If the outer diameter and the numerical aperture of the optical fiber are determined, the BPP value may be constant. Additionally, if the BPP value of an input terminal is smaller than the BPP value of an output terminal, loss of the pump-light does not occur.

For example, the first optical fiber 10 may correspond to the output terminal, and the second and third optical fibers 20 and 30 may correspond to the input terminal bundle. The first cladding 14 of the first optical fiber 10 may have the diameter of about 125 μm and the numerical aperture (NA) of about 0.46. In this case, the BPP value of the first optical fiber 10 may be 57.2. The outer diameter of the input terminal bundle consisting of the second optical fiber 20 and the third optical fibers 30 adjacent to the connector 40 may be about 375 μm. Each of the third optical fibers 30 may have the numerical aperture of about 0.15 or less. An outer diameter of the fourth cladding 32 may be about 125 μm. Thus, the BPP value of the input terminal optical fiber bundle may be 56.25 (=125×3×0.15). As a result, the input terminal optical fiber bundle is smaller than the output terminal (i.e., the first optical fiber 10). Here, the fifth cladding 44 may be tapered by a length of about 2 cm or more. The connector 40 may increase pump-light joint efficiency of the third optical fiber 30 between the first optical fiber 10 and the second optical fiber 20.

Thus, the optic coupler 100 according to embodiments of the inventive concept may improve or maximize optical joint efficiency.

A method of manufacturing the optic coupler 100 according to the first embodiment of the inventive concept will be described with reference to FIGS. 2 to 4.

Figure 2:
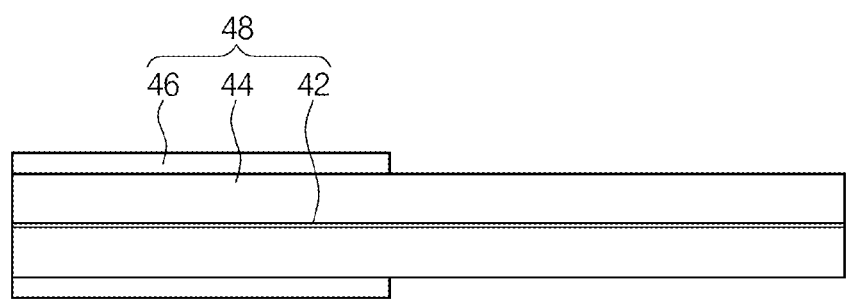
FIGS. 2 to 4 are cross-sectional views illustrating a method of manufacturing an optic coupler according to a first embodiment of the inventive concept.
Figure 3:
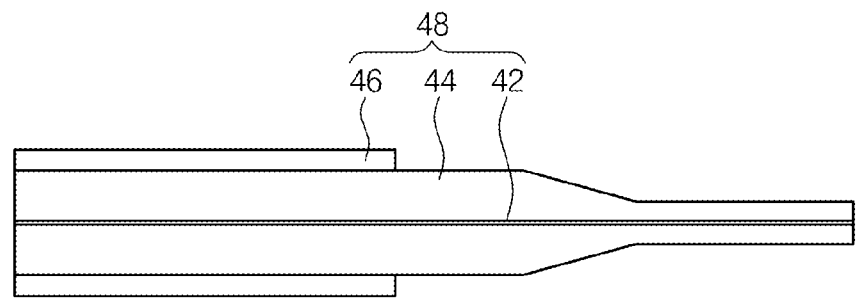
Figure 4:
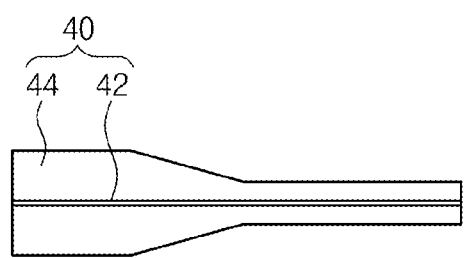

FIGS. 2 to 4 are cross-sectional views illustrating a method of manufacturing an optic coupler according to a first embodiment of the inventive concept.

Referring to FIGS. 1 and 2, a sixth cladding 46 of a fourth optical fiber 48 may be partially removed to expose the fifth cladding 44. The sixth cladding 46 may be stripped from the fifth cladding 44 by a chemical or mechanical method. A diameter of the fourth optical fiber 48 may be equal to an outer diameter of a bundle consisting of the second optical fiber 20 and the third optical fibers 30. For example, each of the second and third optical fibers 20 and 30 may have a diameter of about 125 μm. Additionally, the fifth cladding 44 may have a diameter of about 375 μm (=125×3) or about 725 μm (=125×5).

Referring to FIGS. 1 and 3, the fifth cladding 44 may be etched to become tapered. The fifth cladding 44 may be etched by a chemical etching method or a physical etching method. An end of the fifth cladding 44 may be etched to have the same diameter as the first optical fiber 10. For example, the end of the fifth cladding 44 may be etched to have the diameter of about 125 μm. Subsequently, the etched surface of the fifth cladding 44 may be polished by an optical polishing process.

Referring to FIGS. 1 and 4, the fifth cladding 44 may be cloven to form the connector 40. The fifth cladding 44 may be cloven by a tool such as a saw or a knife. A first facet of the connector 40 adjacent to the first optical fiber 10 may have a first outer diameter equal to that of the first optical fiber 10. A second facet of the connector 40 adjacent to the second optical fiber 20 may have a second outer diameter equal to the outer diameter of the bundle consisting of the second optical fiber 20 and the third optical fibers 30. The first facet of the connector 40 may be joined to the first optical fiber 10, and the second facet of the connector 40 may be joined to the second optical fiber 20 and the third optical fibers 30. The first to third optical fibers 10, 20, and 30 may be joined to the connector 40 by splicing.

Figure 5:
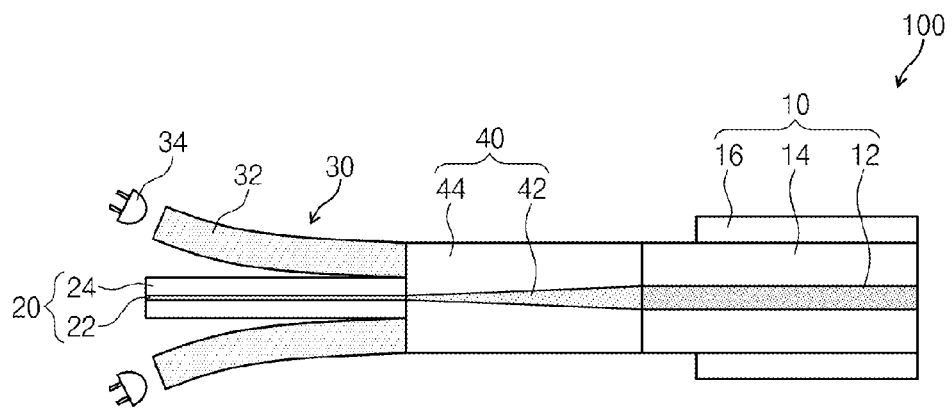
FIG. 5 is a cross-sectional view illustrating an optic coupler according to a second embodiment of the inventive concept.

FIG. 5 is a cross-sectional view illustrating an optic coupler according to a second embodiment of the inventive concept.

Referring to FIG. 5, according to a second embodiment of the inventive concept, a third core 42 of an optic coupler may be connected between a first core 12 and a second core 22 having a diameter different from that of the first core 12. The third core 42 may buffer difference between the diameters of the first and second cores 12 and 22, thereby minimizing or preventing optical loss. A fifth cladding 44 may have a diameter equal to a diameter of a first cladding 14 of the first optical fiber 10. The diameter of the first cladding 14 may be greater than that of the second optical fiber 20. The second optical fiber 20 and third optical fibers 30 may have the same diameter. A facet of the fifth cladding 44 adjacent to the second optical fiber 20 may have a diameter equal to an outer diameter of a bundle consisting of the second optical fiber 20 and the third optical fibers 30 around the second optical fiber 20. The third core 42 of the connector 40 may transmit a signal light applied from the second core 22 of the second optical fiber 20 to the first core 12 of the first optical fiber 10 without loss. Additionally, the connector 40 may transmit pump-light supplied from the third optical fibers 30 to the first cladding 14 of the first optical fiber 10. Thus, the connector 40 and the first optical fiber 10 may couple the pump-light with the signal light.

Thus, the optic coupler 100 according to the second embodiment of the inventive concept may improve or maximize the optical joint efficiency.

Figure 6:
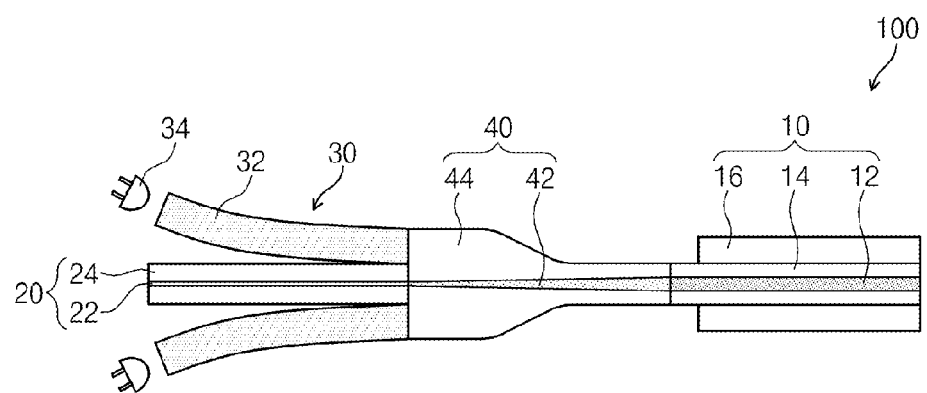
FIG. 6 is a cross-sectional view illustrating an optic coupler according to a third embodiment of the inventive concept.

FIG. 6 is a cross-sectional view illustrating an optic coupler according to a third embodiment of the inventive concept.

Referring to FIG. 6, a fifth cladding 44 of a connector 40 may be tapered from second and third optical fibers 20 and 30 toward a first optical fiber 10. A third core 42 of the connector 40 may be tapered from the first optical fiber 10 toward the second and third optical fibers 20 and 30. Thus, the connector 40 may include the third core 42 and the fifth cladding 44 which are tapered in directions opposite to each other, respectively. The first optical fiber 10 may include a first core 12 having a diameter greater than that of the second core 22 of the second optical fiber 20, and a first cladding 14 having a diameter equal to that of a third cladding 24 of the second optical fiber 20. The first cladding 14 may have a diameter equal to that of a fourth cladding 32 of the third optical fiber 30. The connector 40 may connect the first cladding 14 to the second optical fiber 20 and the third optical fibers 30 surrounding the second optical fiber 20. The third core 42 of the connector 40 may be tapered for buffing difference between the diameters of the first and second cores 12 and 22. The connector 40 may increase the joint efficiency of the third optical fibers 30.

Thus, the optic coupler 100 according to the second embodiment of the inventive concept may improve or maximize the optical joint efficiency.

Methods of manufacturing the optic couplers 100 according to the second and third embodiments will be described with reference to FIGS. 7 and 8.

Figure 7:
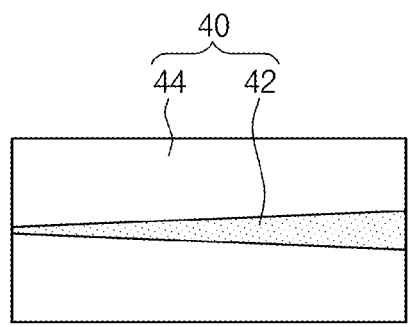
FIGS. 7 and 8 are cross-sectional views illustrating methods of manufacturing optic couplers according to second and third embodiments of the inventive concept.
Figure 8:
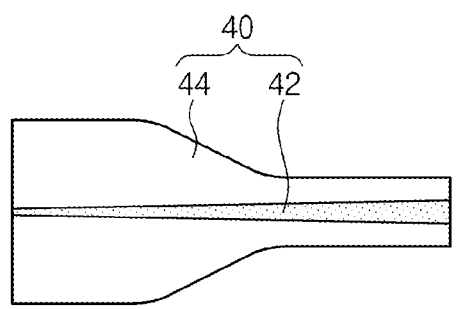

FIGS. 7 and 8 are cross-sectional views illustrating methods of manufacturing optic couplers according to second and third embodiments of the inventive concept.

Referring to FIGS. 2 to 4, first, after the fifth cladding 44 of the fourth optical fiber 48 may be etched to become tapered, the fourth optical fiber 48 may be cloven. Here, the third core 42 of the fourth optical fiber 48 may have a diameter equal to that of the first core 12. The third core 42 may have a diameter greater than that of the second core 22.

Referring to FIG. 7, the fourth optical fiber 48 may be lengthened in a longitudinal direction thereof, thereby forming a tapered third core 42. The fifth cladding 44 and the third core 42 may be lengthened by a thermal treatment. The fifth cladding 44 may extend to have a uniform diameter. The third core 42 may extend in tapered-shape. A first facet of the third core 42 may have a diameter equal to that of the second core 22 and a second facet of the third core 42 may have a diameter equal to that of the first core 12.

Referring to FIG. 7, a portion of the fifth cladding 44 may be etched to become tapered. The fifth cladding 44 may become tapered by a chemical or mechanical etching. The fifth cladding 44 may be tapered in a direction opposite to a tapered direction of the third core 42. An end facet of the tapered fifth cladding 44 may have a diameter equal to that of the first cladding 14.

Referring to FIGS. 5 and 6, the second optical fiber 20 and the third optical fibers 30 may be joined to a second facet of the connector 40. The first optical fiber 10 may be joined to a first facet of the connector 40. The first to third optical fibers 10, 20, and 30 may be joined to the connector 40 by splicing.

Figure 9:
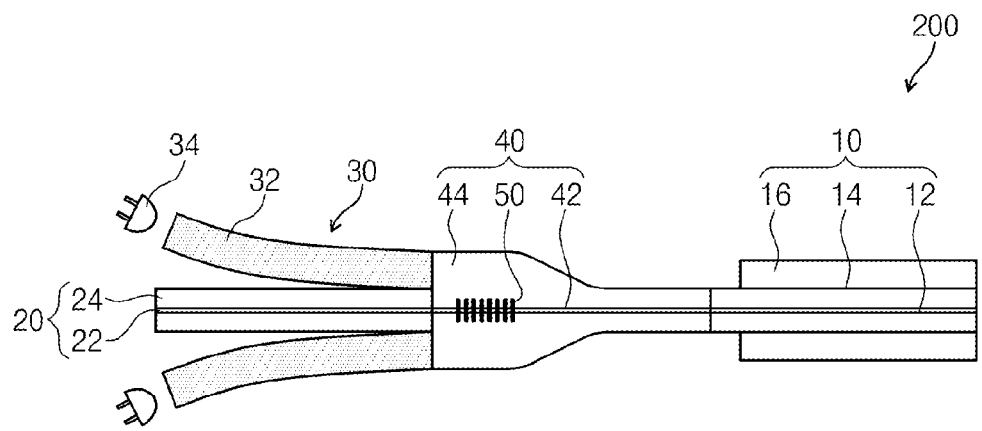
FIGS. 9 to 11 are cross-sectional views illustrating optical fiber laser devices according to first to third application examples of the inventive concept.
Figure 10:
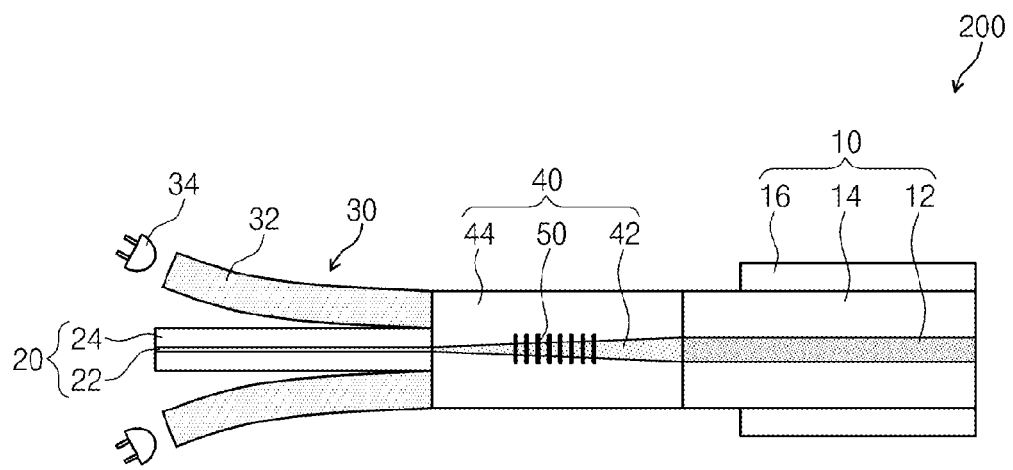
Figure 11:
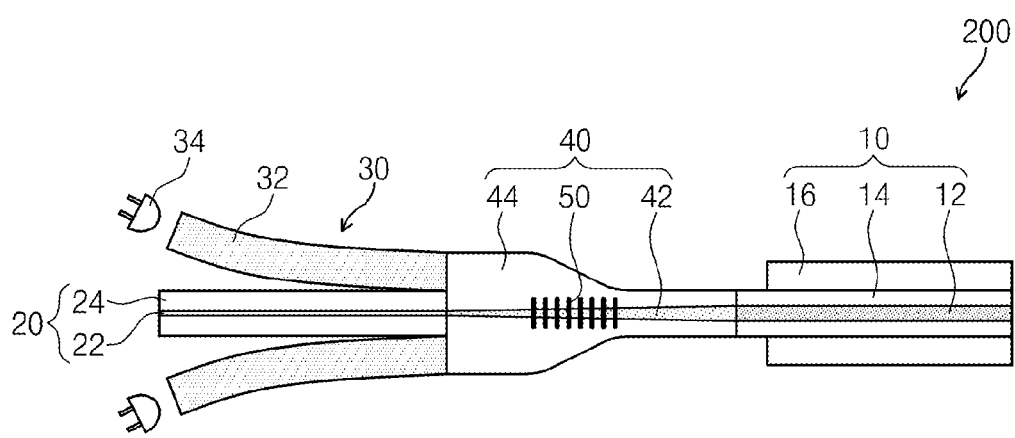

FIGS. 9 to 11 are cross-sectional views illustrating optical fiber laser devices according to first to third application examples of the inventive concept.

Referring to FIGS. 9 to 11, according to first to third application examples of the inventive concept, an optical fiber laser device 200 may include a Bragg grating 50 formed on the third core 42 of the connector 40 which is disposed between the first and second optical fibers 10 and 20 and connects the third optical fibers 30. The third core 42 may include a silicon glass doped with germanium. The Bragg grating 50 may be formed at regular intervals by a ultraviolet pulse. The Bragg grating 50 may generate a laser light of a single wavelength from the pump-light. Additionally, the Bragg grating 50 may improve an output power of the laser light guided in the first core 12 of the first optical fiber 10. The third core 42 of the connector 40 may have a diameter equal to that of each of the first and second cores 12 and 22. Alternatively, if the first core 12 has a diameter greater than that of the second core 22, the third core 42 may be tapered toward the second core 22. The fifth cladding 44 may have a diameter equal to that of the first cladding 14. When the first cladding 14 and the third cladding 24 have the same diameter, the fifth cladding 44 may be tapered toward the first cladding 14. The pump-light may be transmitted from the third optical fibers 30 to the first cladding 14 through the fifth cladding 44.

Thus, the optical fiber laser devices 200 according to the first to third application examples may increase or maximize the output power of the laser light. Here, the optical fiber laser devices 200 according to the first to third application examples may further include the Bragg gratings 50 formed on the third cores 42 of the optic couplers 100 according to the first to third embodiments of the inventive concept. In some embodiments, the second core 22 of the second optical fiber 20 may be omitted.

Meanwhile, the optic couplers 100 according to the first to third embodiments may realize an optical fiber laser device and a optical fiber amplifier which have a forward pumping mode and a backward pumping mode according to an output direction of the laser light. The optical fiber laser device and the optical fiber amplifier may have a bi-directional pumping mode where the forward and backward pumping modes are mixed, and multi-forward pumping mode. Here, a direction of the connector 40 may be defined as an incident direction of the pump-light. The incident direction of the pump-light may be defined as a connecting direction of the third optical fibers 30 joined to the connector 40.

A direction of the forward pumping mode may be the same as the incident direction of the pump-light and the output direction of the laser light generated from the pump-light. A direction of the backward pumping mode may be reverse to the incident direction of the pump-light and the output direction of the laser light generated from the pump-light.

Thus, a kind of operative active optical modules may be changed according to kinds of optical devices formed at both sides of the first and second optical fibers 10 and 20 of the optic couplers 100 according to the first to third embodiments.

Hereinafter, the following description will be made on embodiments of active optical modules that have various kinds of pumping modes according to the kinds of optical devices which are connected to the first and second optical fibers 10 and 20.

FIGS. 12A to 12D are schematic diagrams illustrating an active optical module 60 according to a fourth embodiment of the inventive concept Referring to FIGS. 12A to 12D, the active optical module 60 may be a continuous output laser device 60 including first and second mirrors 62 and 64 that are formed at an end of the first optical fiber 10 and an end of the second optical fiber 20, respectively. The continuous output laser 60 may generate laser light having a single wavelength band. In more detail, when the pump-light is inputted from the pump-light source 34 to the third optical fibers 30, laser light may be generated in the first to third cores of the first optical fiber 10, the optical fiber 20, and the connector 40 between the first and second mirrors 62 and 64.

The first and second mirrors 62 and 64 may resonate the laser light that is generated in the first optical fiber 10, the optical fiber 20, and the connector 40. The first mirror 62 may reflect about 100% of the laser light, and the second mirror 64 may reflect about 5% to about 20% of the laser light. The first mirror 62 may include a full mirror or a fiber Bragg grating (FBG) that totally reflects the laser light. The second mirror 64 may include a FBG or an output coupler that semi-transmits the laser light. Laser light generated between the first and second mirrors 62 and 64 may be outputted to an end cap 68 or a mercury collimator through a pigtail optical fiber 29 extended from the second mirror 64.

Referring to FIG. 12A, the active optical module 60 may have a forward pumping mode where the optic coupler 100 is disposed in a direction from the first mirror 62 to the second mirror 64. Here, the connector 40 may be disposed in the direction from the first mirror 62 to the second mirror 64. The laser light may be outputted from the second mirror 64 to the end cap 68 through the pigtail optical fiber 29 of the first optical fiber 10. The optic coupler 100 may be disposed adjacently to the first mirror 62. The pump-light may travel along the first optical fiber 10 extended from the connector 40 to the second mirror 64, and be sufficiently absorbed. Thus, in the forward pumping mode, the travelling direction of the pump-light may be the same as the output direction of the laser light. Additionally, in the forward pumping mode, the connection direction of the third optical fibers 30 joined to the connector 40 may be the same as the output direction of the laser light.

Referring to FIG. 12B, the active optical module 60 may have a backward pumping mode where the optic coupler 100 is disposed in a direction from the second mirror 64 to the first mirror 62. The connector 40 may be disposed in the direction from the second mirror 64 to the first mirror 62. The second optical fiber 20 of the optic coupler 100 may be disposed adjacently to the second mirror 64. The pump-light transmitted through the third optical fibers 30 may travel along the first optical fiber 10 extended from the connector 40 to the first mirror 62, and be sufficiently absorbed. Thus, in the backward pumping mode, the travel direction of the pump-light may be opposite to the output direction of the laser light.

Figure 12C:
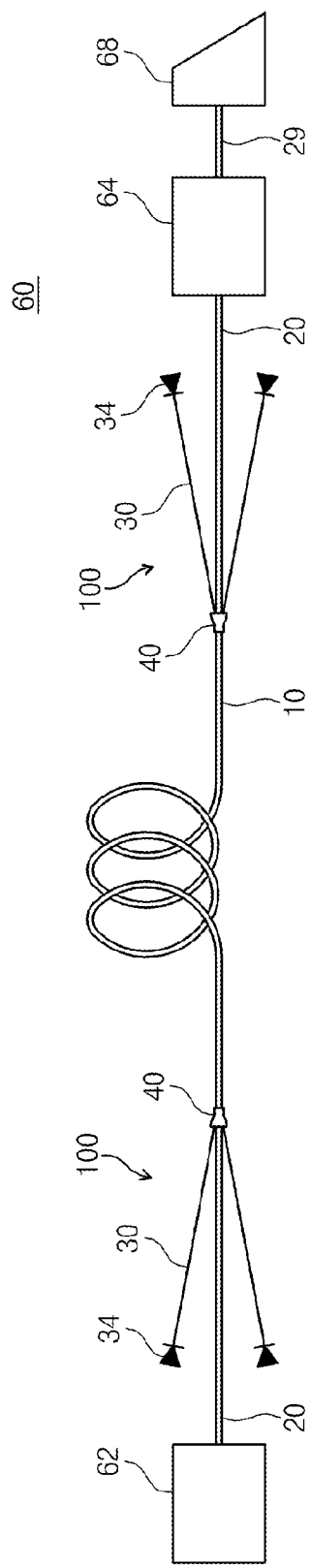

Referring to FIG. 12C, the active optical module 60 may have a bi-directional pumping mode where a plurality of optic couplers 100 are disposed to face each other between the first and second mirrors 62 and 64. Here, the connectors 40 may be disposed to face each other between the first and second mirrors 62 and 64. The optic couplers 100 may respectively transmit the pump-lights in directions opposite to each other in the second optical fibers 20 between the first and second mirrors 62 and 64. Each of the optic couplers 100 may be disposed in a forward direction at the second optical fiber 20 adjacent to each of the first and second mirrors 62 and 64. The connectors 40 disposed at both sides of the first optical fiber 10 may be disposed to face each other. The pump-light may travel along the first optical fiber 10, the second optical fibers 20, and the connectors 40 between the first and second optical fibers 62 and 64, and be sufficiently absorbed into the first to third cores. As a result, in the bi-directional pumping mode, the laser light may be generated by the pump-lights that are transferred along opposite directions in the first optical fiber 10, the second optical fibers 20, and the connectors 40 between the first and second mirrors 62 and 64.

Figure 12D:
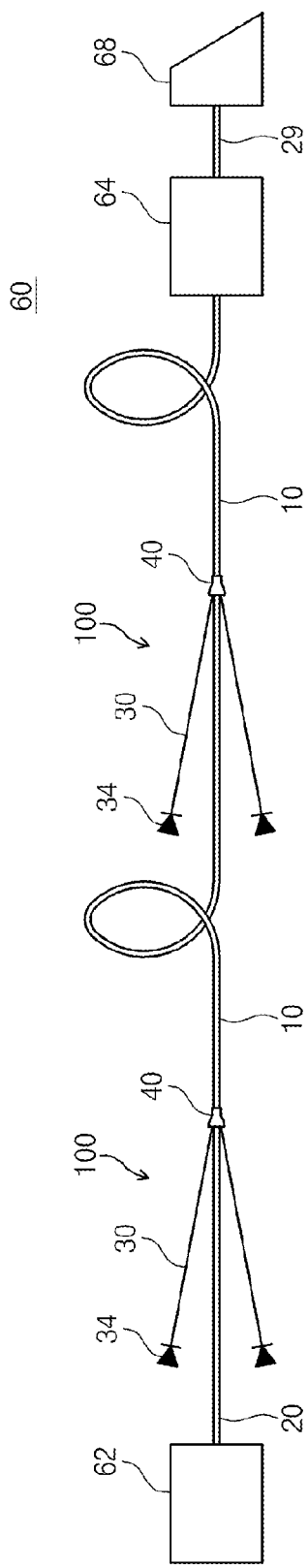

Referring to FIG. 12D, the active optical module 60 may have a multi-forward pumping mode where a plurality of the optic couplers 100 may be disposed in the same direction. The optic couplers 100 may transmit the pump-lights to the first optical fiber 10 in the same direction from the first mirror 62 to the second mirror 64. The plurality of the optic couplers 100 may be disposed in a forward direction between the first and second mirrors 62 and 64. When the pump-light supplied from a first optic coupler 100 is depleted in the first optical fiber 10, the pump-light is supplied from a second optic coupler 100, and thus, an output power of laser light can sequentially increase. The intensity of the pump-light supplied from the second optic coupler 100 may be greater than that of the pump-light supplied the first optic coupler 100.

FIGS. 13A to 13D are schematic diagrams illustrating an active optical module 70 according to a fifth embodiment of the inventive concept.

Referring to FIGS. 13A to 13D, the active optical module 70 may be a Q switching laser device or a mode locking laser device including a first mirror 62 and a modulator 76 formed at the second optical fiber 20 of the optic coupler 100, and a second mirror 64 formed at the first optical fiber 10 of the optic coupler 100. The Q switching laser device or the mode locking laser device may generate pulse laser light. Laser light may be generated in the first optical fiber 10, the second optical fiber 20 and the connector 40 between the first and second mirrors 62 and 64. The laser may resonate by the first and second mirrors 62 and 64.

The modulator 76 may modulate laser light with an analog or digital electric signal. The modulator 76 may switch the laser light, generated between the first and second mirrors 62 and 64, to generate the pulse laser light. The pulse laser light may be generated by a periodic turn-on/off operation of the modulator 76. For example, the pulse laser light may be generated when the modulator 76 is turned on, and the pulse laser light may not be generated when the modulator 76 is turned off.

The first mirror 62 may reflect about 100% of the laser light, and the second mirror 64 may reflect about 5% to about 20% of the laser light. The first mirror 62 may include a full mirror or a FBG that totally reflects the laser light. The second mirror 64 may include a FBG or an output coupler that semi-transmits the laser light. The laser light generated between the first and second mirrors 62 and 64 may be outputted to an end cap 68 or a mercury collimator through a pigtail optical fiber 29 extended from the second mirror 64.

Referring to FIG. 13A, the active optical module 70 may have a forward pumping mode where the optic coupler 100 is disposed in a direction from the first mirror 62 to the second mirror 64. Here, the pulse laser light may be outputted from the second mirror 64 to the end cap 68 through the pigtail optical fiber 29. The optic coupler 100 may be disposed to be adjacent to the first mirror 62. The connector 40 may be disposed in the direction from the first mirror 62 to the second mirror 64. The pump-light may travel along the first optical fiber 10 extended from the connector 40 to the second mirror 64, and be sufficiently absorbed. Thus, in the forward pumping mode, the travel direction of the pump-light may be the same as the output direction of the pulse laser light.

Referring to FIG. 13B, the active optical module 70 may have a backward pumping mode where the optic coupler 100 is disposed in a direction from the second mirror 64 to the first mirror 62. The optic coupler 100 may be disposed to be adjacent to the second mirror 64. The connector 40 may be disposed in the direction from the second mirror 64 to the first mirror 62. The pump-light may travel along the first optical fiber 10 extended from the connector 40 to the first mirror 62, and be sufficiently absorbed. The pulse laser light may pass through the first optical fiber 10, the connector 40 and the second optical fiber 20. Thus, in the backward pumping mode, the travel direction of the pump-light may be opposite to the output direction of the pulse laser light.

Figure 13C:
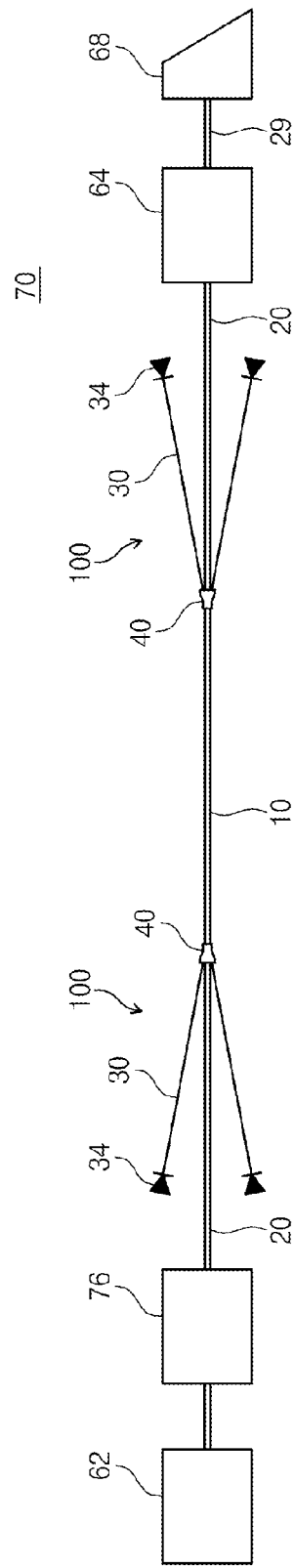

Referring to FIG. 13C, the active optical module 70 may have a bi-directional pumping mode where a plurality of the optic couplers 100 are disposed to face each other between the first and second mirrors 62 and 64. The optic couplers 100 may supply the pump-lights to the first optical fiber 10 between the first and second mirrors 62 and 64 in directions opposite to each other, respectively. The pump-lights may travel along the first optical fiber 10, the connector 40, and the second optical fibers 20 between the first and second mirrors 62 and 64, and be sufficiently absorbed into the first to third cores. Thus, in the bi-directional pumping mode, the pulse laser light may be generated in the first and second optical fibers 10 and 20 between the first and second mirrors 62 and 64 by the pump-lights that are transmitted in the directions opposite to each other.

Figure 13D:
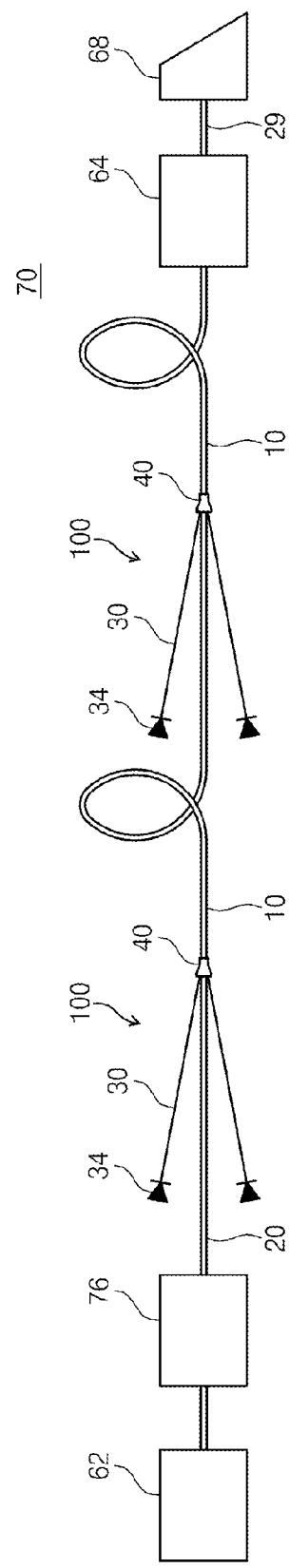

Referring to FIG. 13D, the active optical module 70 may have a multi-forward pumping mode where a plurality of the optic couplers 100 are disposed in the same direction between the first and second mirrors 62 and 64. The optic couplers 100 may transmit the pump-lights having the same direction in the first optical fiber 10. When the pump-light supplied from a first optic coupler 100 is depleted in the first optical fiber 10, the pump-light is supplied from a second optic coupler 100, and thus, an output power of the laser light can sequentially increase. The intensity of the pump-light supplied from the second optic coupler 100 may be greater than that of the pump-light supplied the first optic coupler 100.

FIGS. 14A to 14D are schematic diagrams illustrating an active optical module 80 according to a sixth embodiment of the inventive concept.

Referring to FIGS. 14A to 14D, the active optical module 80 may be a laser optical fiber amplifier where a signal source 86 and first isolator 82 are formed at one side of the optic coupler 100 and a second isolator 84 is formed at the other side of the optic coupler 100. The laser optical fiber amplifier 80 may amplify laser light with the pump-light which is transmitted from the optic coupler 100. The signal source 86 may include a semiconductor light source, an output terminal of another laser optical fiber amplifier, and an optical fiber laser device. The pump-light source 34 may supply the pump-light to the first optical fiber 10. A signal outputted from the signal source 86 may be amplified to output laser light. Accordingly, the laser optical fiber amplifier 80 may output the laser light that is amplified according to the signal of the signal source 86.

The first and second isolators 82 and 84 may transfer the laser light to an end cap 68 along the first and second optical fibers 10 and 20. The first isolator 82 may pass the signal outputted from the signal source 86. On the other hand, the first isolator 82 may interrupt the laser light that returns to the signal source 86. The second isolator 82 may pass the laser light that travels to the end cap 68 through the pigtail optical fiber 29. On the other hand, the second isolator 82 may interrupt the laser light that returns from the end cap 68 to the first optical fiber 10 through the pigtail optical fiber 29. The second isolator 82 may be omitted.

Referring to FIG. 14A, the active optical module 80 may have a forward pumping mode where the optic coupler 100 is disposed in a direction from the first isolator 82 to the second isolator 84. Here, the connector 40 may be disposed in the direction from the first isolator 82 to the second isolator 84. Output laser light may be outputted from the second isolator 84 to the end cap 68 through the pigtail optical fiber 29. The optic coupler 100 may be disposed to be adjacent to the first isolator 82. The pump-light may travel along the second optical fiber 20, the connector 40, and the first optical fiber 10 connected from the first isolator 82 to the second isolator 84, and be sufficiently absorbed. Accordingly, in the forward pumping mode, the travel direction of the pump-light may be the same as the output direction of the amplified output laser light.

Referring to FIG. 14B, the active optical module 80 may have a backward pumping mode where the optic coupler 100 is disposed in a direction from the second isolator 84 to the first isolator 82. The optic coupler 100 may be disposed to be adjacent to the second isolator 84. The connector 40 may be disposed in the direction from the second isolator 84 to the first isolator 82. The pump-light may be sufficiently absorbed in the first optical fiber 10 extended from the connector 40 to the first isolator 82. Accordingly, in the backward pumping mode, the travel direction of pump light may be opposite to the output direction of the amplified output laser light.

Figure 14C:
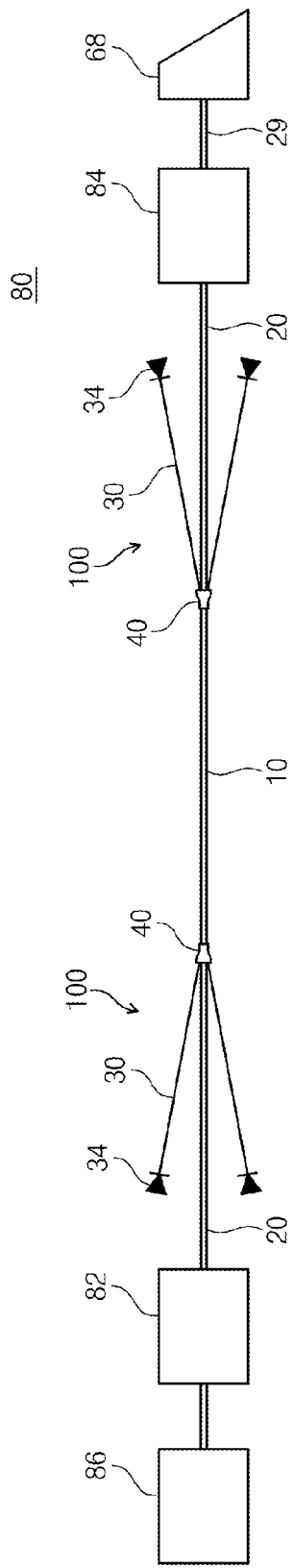

Referring to FIG. 14C, the active optical module 80 may have a bi-directional pumping mode where a plurality of the optic couplers 100 are disposed to face each other. Here, the first and second isolators 82 and 84 may interrupt laser light that travels in a backward direction. The optic couplers 100 may be disposed to be adjacent to the first and second isolators 82 and 84, respectively. The pump-light may be absorbed in the first optical fiber 10, the second optical fibers 20 and the connector 40 between the first and second isolators 82 and 84. Accordingly, in the bi-directional pumping mode, amplified laser light may be generated by the pump-lights that are respectively transferred in opposite directions between the first and second isolators 82 and 84.

Figure 14D:
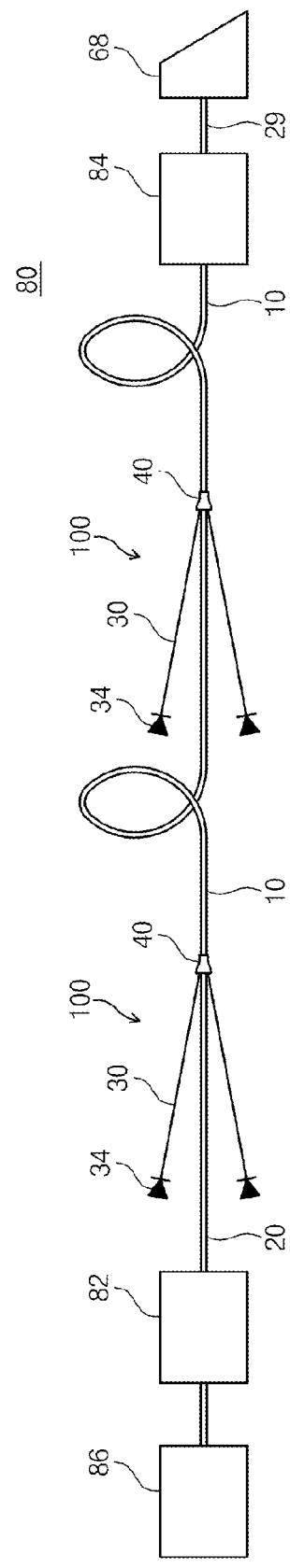

Referring to FIG. 14D, the active optical module 80 may have a multi-forward pumping mode where a plurality of the optic couplers 100 are disposed in the same direction between the first and second isolators 82 and 84. When the pump-light supplied from a first optic coupler 100 is depleted in the second optical fiber 20, the pump-light is supplied from a second optic coupler 100, and thus, the amplification of the laser light can sequentially increase. The intensity of the pump-light supplied from the second optic coupler 100 may be greater than that of the pump-light supplied the first optic coupler 100.

FIGS. 15A to 15D are schematic diagrams illustrating an active optical module 90 according to a seventh embodiment of the inventive concept.

Referring to FIGS. 15A to 15D, the active optical module 90 may be a Master Oscillator-Power-Amplifier (MOPA) optical fiber amplifier 90 where a master oscillator 96 and the first isolator 82 are formed at one side of the optic coupler 100 and the second isolator 84 is formed at the other side of the optic coupler 100. The MOPA optical amplifier 90 may amplify laser light with the pump-light which is transferred from the optic coupler 100. The laser light may be outputted as pulse laser light according to a pulse signal inputted from the master oscillator 96. The master oscillator 96 may include a frequency oscillator that generates the pulse signal.

The first and second isolators 82 and 84 may transfer the laser light to an end cap 68. The first isolator 82 may pass a signal outputted from a signal source 92. On the other hand, the first isolator 82 may interrupt the laser light that returns to the signal source 92. The second isolator 84 may pass the laser light that travels to the end cap 68 through a pigtail optical fiber 29. On the other hand, the second isolator 84 may interrupt the laser light that returns from the end cap 68 to the first optical fiber 10 or the second optical fiber 20 through the pigtail optical fiber 29. The second isolator 84 may not be provided.

Figure 15A:
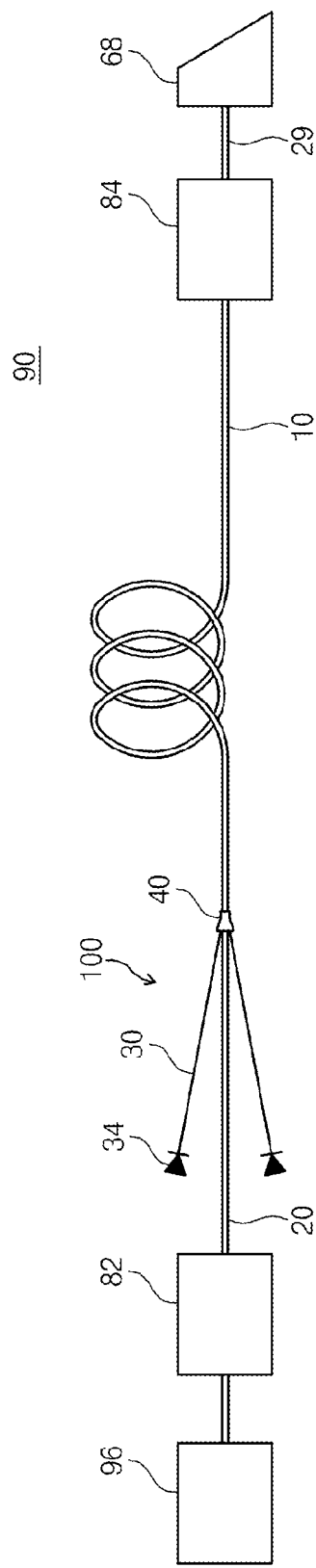
FIGS. 15A to 15D are schematic diagrams illustrating an active optical module according to a seventh embodiment of the inventive concept.

Referring to FIG. 15A, the active optical module 90 may have a forward pumping mode where the optic coupler 100 is disposed in a direction from the first isolator 82 to the second isolator 84. Here, the connector 40 may be disposed in the direction from the first isolator 82 to the second isolator 84. Pulse laser light may be outputted from the second isolator 84 to the end cap 68 through the pigtail optical fiber 29. The optic coupler 100 may be disposed to be adjacent to the first isolator 82. The pump-light may travel along the second optical fiber 20, the connector 40, and the first optical fiber 10 extended from the first isolator 82 to the second isolation 84, and be sufficiently absorbed. In the forward pumping mode, accordingly, the travel direction of the pump-light may be the same as the output direction of amplified pulse laser light.

Figure 15B:
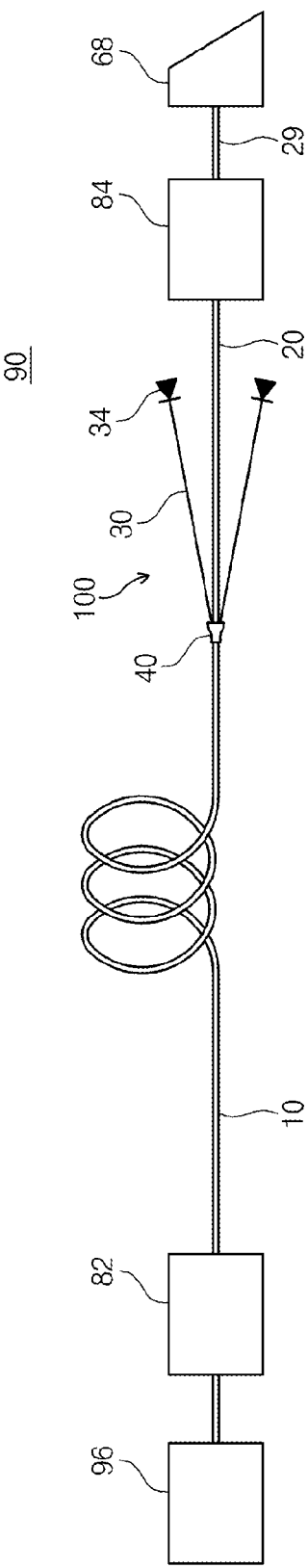

Referring to FIG. 15B, the active optical module 90 may have a backward pumping mode where the optic coupler 100 is disposed in a direction from the second isolator 84 to the first isolator 82. The optical coupler 100 may be disposed to be adjacent to the second isolator 84. The connector 40 may be disposed in the direction from the second isolator 84 to the first isolator 82. The pump-light may travel along the second optical fiber 20, the connector 40, and the first optical fiber 10 extended from the second isolator 84 to the first isolator 82, and be sufficiently absorbed. In the backward pumping mode, accordingly, the travel direction of the pump-light may be opposite to the output direction of amplified pulse laser light.

Figure 15C:
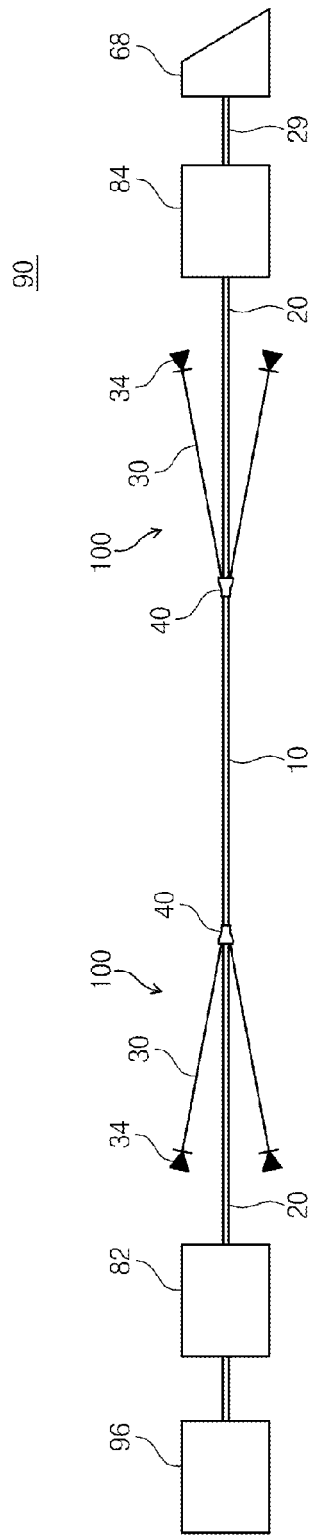

Referring to FIG. 15C, the active optical module 90 may have a bi-directional pumping mode where a plurality of the optic couplers 100 are disposed to face each other and are disposed to be adjacent to the first and second isolators 82 and 84, respectively. The first and second isolators 82 and 84 may interrupt laser light that travels in a backward direction. The optic couplers 100 may transfer the pump-lights in opposite directions, respectively. In the bi-directional pumping mode, accordingly, pulse laser light may be amplified by the pump-lights that are transferred in different opposite directions, respectively.

Figure 15D:
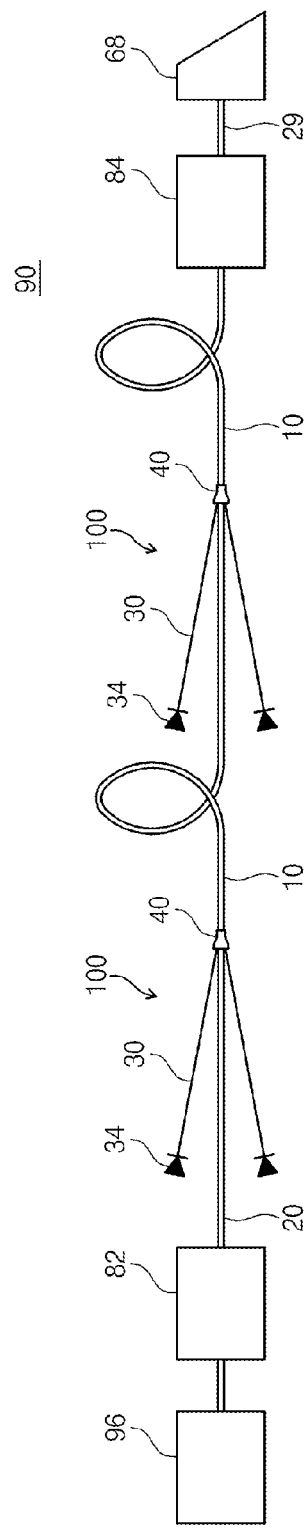

Referring to FIG. 15D, the active optical module 90 may have a multi-forward pumping mode where a plurality of the optical couplers 100 may be disposed in the same direction. The optical couplers 100 may transfer the pump-lights in a direction from the first isolator 82 to the second isolator 84. When the pump-light supplied from a first optic coupler 100 is depleted in the first optical fiber 10, the pump-light is supplied from a second optic coupler 100, and thus, the amplification of laser light can sequentially increase. The intensity of the pump-light supplied from the second optical coupler 100 may be greater than that of the pump-light supplied the first optical coupler 100.

According to embodiments of the inventive concept, the connector may be connected between the first optical fiber and the second optical fiber. The connector may join the third optical fibers transmitting the pump-light toward the first optical fiber. The connector may be tapered toward the first optical fiber. The connector may transmit the pump-light from the third optical fibers to the first optical fiber without loss. Thus, joint efficiency may be increased or maximized.

As a result, the optic coupler may increase or maximize the optical joint efficiency.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. An optic coupler comprising:
   a first optical fiber having a first core and a first cladding surrounding the first core;
   a second optical fiber transmitting a signal light to the first optical fiber, the second optical fiber being a few mode optical fiber having a second core and a third cladding surrounding the second core;
   third optical fibers providing a pump-light to the first optical fiber in a direction parallel to the second optical fiber, the third optical fibers includes a multi-mode optical fiber having a fourth core; and
   a connector disposed between the first optical fiber and the second optical fiber, the connector being connected with the third optical fibers, that are disposed around the second optical fiber, and toward the first optical fiber, the connector including a third core connected between the first core and the second core, and a fifth cladding surrounding the third core, the fifth cladding connected between the first cladding and the third optical fibers, the third core having a diameter equal to that of each of the first and second cores.

2. The optic coupler of claim 1, wherein the first optical fiber comprises a double cladding optical fiber further having a second cladding surrounding the first cladding.

3. The optic coupler of claim 1, wherein the third core is tapered between the first core and the second core.

4. The optic coupler of claim 3, wherein the fifth cladding is tapered in a direction opposite to a tapered direction of the third core.

5. The optic coupler of claim 3, wherein the first core has a diameter greater than that of the second core.

6. An optical fiber laser device comprising:
   a first optical fiber having a first core, and first and second claddings surrounding the first core;

a second optical fiber having a second core transmitting a signal light to the first optical fiber and a third cladding surrounding the second core;

third optical fibers transmitting pump-light to the first optical fiber in a direction parallel to the second optical fiber, the third optical fibers having fourth cores disposed around the second optical fiber, respectively; and a connector having a third core connected between the first core and the second core and a fifth cladding surrounding the third core, the third core having a Bragg grating, and the fifth cladding connecting the third optical fibers disposed around the second optical fiber to the first optical fiber.

7. The optical fiber laser device of claim 6, wherein the third core of the connector is tapered toward the second core, and the first core has a diameter greater than that of the second core.

8. The optical fiber laser device of claim 6, wherein the fifth cladding is tapered toward the first cladding.

9. An active optical module comprising:
a pump-light source supplying pump-light;
an optic coupler including
a first optical fiber, the first optical fiber having a first core and a first cladding surrounding the first core,
a second optical fiber having a second core, the second optical fiber transmitting a signal light to the first optical fiber,
third optical fibers providing the pump-light to the first optical fiber in a direction parallel to the second optical fiber, and
a connector disposed between the first optical fiber and the second optical fiber, the connector being connected with the third optical fibers, that are disposed around the second optical fiber, and the first optical fiber, the connector including a third core connected between the first core and the second core, and a fifth cladding surrounding the third core, the fifth cladding connected between the first cladding and the third optical fibers, the third core having a diameter equal to that of each of the first and second cores;

a first optical device connected to the second optical fiber; and a second optical device connected to the first optical fiber opposite to the first optical device, the second optical device outputting laser light generated in the first optical fiber, the second optical fiber, and the connector by the pump-light.

10. The active optical module of claim 9, wherein the active optical module has a forward pumping mode where the connector of the optic coupler is disposed in a direction from the first optical device to the second optical device so that a direction of travel of the pump-light is the same as an output direction of the laser light.

11. The active optical module of claim 9, wherein the active optical module has a backward pumping mode where the connector of the optic coupler is disposed in a direction from the second optical device to the first optical device so that a direction of travel of the pump-light is the opposite as an output direction of the laser light.

12. The active optical module of claim 9, wherein the optic coupler is provided in plural so that the connector includes a plurality of connectors; and
wherein the active optical module has a bi-directional pumping mode where the connectors of the plurality of optic couplers are disposed to face each other so that directions of travel of the pump-light are opposite each other.

13. The active optical module of claim 9, wherein the optic coupler is provided so that the connector includes a plurality of connectors; and
wherein the active optical module has a multi-forward pumping mode where the connectors of the plurality of optic couplers are disposed to face in a same direction other so that directions of travel of the pump-light are the same as each other.

14. The active optical module of claim 9, wherein the first optical device is a first mirror and the second optical device is a second mirror.

15. The active optical module of claim 14, further comprising:
a modulator disposed at the first optical fiber between the first and second mirrors.

16. The active optical module of claim 9, wherein the first optical device is a first isolator and the second optical device is a second isolator.

17. The active optical module of claim 9, wherein the second optical fiber is a few-mode optical fiber having a third cladding surrounding the second core.

18. The active optical module of claim 17, wherein the third optical fibers comprise a multi-mode optical fiber having a fourth core.

19. The active optical module of claim 18, wherein the connector comprises a fifth cladding surrounding the third core, the fifth cladding connected between the first cladding and the third optical fibers.

20. The active optical module of claim 19, wherein the fifth cladding is tapered in a direction opposite to a tapered direction of the third core.

21. The active optical module of claim 9, wherein the first core has a diameter greater than that of the second core.

* * * * *